US009869397B2

(12) United States Patent
Vaseleniuck et al.

(10) Patent No.: US 9,869,397 B2
(45) Date of Patent: Jan. 16, 2018

(54) MODULAR ROTARY VALVE APPARATUS

(71) Applicant: VAZTEC, LLC, Denver, NC (US)

(72) Inventors: Darrick Vaseleniuck, Denver, NC (US); David Vaseleniuck, Denver, NC (US)

(73) Assignee: VAZTEC ENGINE VENTURE, LLC, Denver, NC (US)

( * ) Notice: Subject to any disclaimer, the term of this patent is extended or adjusted under 35 U.S.C. 154(b) by 211 days.

(21) Appl. No.: 14/608,891

(22) Filed: Jan. 29, 2015

(65) Prior Publication Data
US 2016/0222840 A1    Aug. 4, 2016

(51) Int. Cl.
| | | |
|---|---|---|
| F02B 75/20 | (2006.01) |
| F01L 7/00 | (2006.01) |
| F16K 3/24 | (2006.01) |
| F01L 1/02 | (2006.01) |
| F01L 7/02 | (2006.01) |
| F01L 7/16 | (2006.01) |
| F01L 1/34 | (2006.01) |
| F01L 13/06 | (2006.01) |
| F01L 1/047 | (2006.01) |
| F01L 1/053 | (2006.01) |

(52) U.S. Cl.
CPC  *F16K 3/24* (2013.01); *F01L 1/02* (2013.01); *F01L 7/026* (2013.01); *F01L 7/027* (2013.01); *F01L 7/16* (2013.01); *F01L 1/34* (2013.01); *F01L 13/06* (2013.01); *F01L 2001/0476* (2013.01); *F01L 2001/0537* (2013.01); *F01L 2101/00* (2013.01); *F01L 2101/02* (2013.01); *F01L 2250/02* (2013.01); *F01L 2250/04* (2013.01); *F01L 2810/02* (2013.01)

(58) Field of Classification Search
CPC . F01L 7/024; F01L 7/022; F01L 7/026; F01L 7/021; F01L 7/023; F01L 1/02; F01L 7/027; F01L 7/16; F01L 1/34; F01L 13/06; F01L 2001/0537; F01L 2101/00; F01L 2101/02; F01L 2250/02; F01L 2250/04; F01L 2810/02; F16K 3/24
USPC ............ 123/197.4, 193.5, 59.1–59.4, 80 BA, 123/190.1, 190.12
See application file for complete search history.

(56) References Cited

U.S. PATENT DOCUMENTS

| | | |
|---|---|---|
| 1,094,329 A | 4/1914 | Henderson |
| 1,794,061 A | 2/1931 | Culver |

(Continued)

FOREIGN PATENT DOCUMENTS

| | | |
|---|---|---|
| EP | 0099873 | 2/1984 |
| ES | 2076063 | 10/1995 |

OTHER PUBLICATIONS

Vorobiev, V., International Search Report for PCT/US2012/059506, dated Dec. 24, 2012, Moscow, Russia.

(Continued)

*Primary Examiner* — Syed O Hasan
(74) *Attorney, Agent, or Firm* — Trego, Hines & Ladenheim, PLLC

(57) ABSTRACT

A modular rotary valve apparatus includes: a plurality of separate valve barrels coupled to each other and arranged end-to-end along an axis so as to define a valve shaft, each valve barrel having an annular peripheral surface extending between forward and aft end faces, and an aperture extending transversely therethrough communicating with the peripheral surface on opposite sides.

14 Claims, 16 Drawing Sheets

(56) References Cited

U.S. PATENT DOCUMENTS

| | | | |
|---|---|---|---|
| 3,896,781 A | | 7/1975 | Smith |
| 4,036,184 A | | 7/1977 | Guenther |
| 4,949,685 A | | 8/1990 | Doland et al. |
| 5,020,349 A | * | 6/1991 | Lee ............... E05B 15/1614 70/404 |
| 5,724,926 A | * | 3/1998 | Wilke ............... F01L 7/026 123/190.2 |
| 6,295,961 B1 | | 10/2001 | Carter |
| 6,308,677 B1 | | 10/2001 | Bohach |
| 7,240,654 B2 | | 7/2007 | Verdial |
| 2002/0148428 A1 | * | 10/2002 | Pisano ............. F01L 1/34406 123/190.2 |
| 2006/0150930 A1 | | 7/2006 | Swenson |
| 2006/0185640 A1 | * | 8/2006 | Barnes ............... F01L 7/022 123/190.8 |
| 2011/0277719 A1 | | 11/2011 | Snow |

OTHER PUBLICATIONS

Yann, Aubry, Examination Report for EP12840722.8-1603, dated Feb. 9, 2016, European Patent Office.

\* cited by examiner

MODULAR ROTARY VALVE APPARATUS

BACKGROUND OF THE INVENTION

This invention relates generally to internal combustion engines, and more particularly to engines using rotary valves.

Internal combustion engines are well known and are used in various applications. For example, internal combustion engines are used in automobiles, farm equipment, lawn mowers, and watercraft. Internal combustion engines also come in various sizes and configurations, such as two stroke or four stroke and ignition or compression.

Typically, internal combustion engines (FIG. 1) include a multitude of moving parts, for example, they include intake and exhaust valves, rocker arms, springs, camshafts, connecting rods, pistons, and a crankshaft. One of the problems with having a multitude of moving parts is that the risk of failure increases (particularly in the valve train) and efficiency decreases due to frictional losses. Special lubricants and coatings may be used to reduce friction and certain alloys may be used to prevent failure; however, even with these enhancements, the risk of failure and the frictional losses remain high.

Accordingly, there remains a need for a valvetrain for an internal combustion engine with low friction, good reliability, and a small number of parts.

BRIEF SUMMARY OF THE INVENTION

This need is addressed by the present invention, which provides a valvetrain incorporating a pair of rotating valve shafts with apertures therein that function to open and close intake and exhaust ports of an internal combustion engine.

According to one aspect of the invention, a modular rotary valve apparatus includes: a plurality of separate valve barrels coupled to each other and arranged end-to-end along an axis so as to define a valve shaft, each valve barrel having an annular peripheral surface extending between forward and aft end faces, and an aperture extending transversely therethrough communicating with the peripheral surface on opposite sides.

According to another aspect of the invention, wherein each valve barrel includes: a forward stub shaft extending from the forward end face and including a first mechanical alignment feature; and an aft stub shaft extending from the aft end face and including a second mechanical alignment feature.

According to another aspect of the invention, the mechanical alignment features of axially adjacent valve barrels are engaged with each other so as to maintain a predetermined angular relationship between the adjacent valve barrels.

According to another aspect of the invention, one of the mechanical alignment features comprises pins extending axially from one of the stub shafts, and the other mechanical alignment feature comprises holes formed in the opposing stub shaft.

According to another aspect of the invention, the mechanical alignment features are configured to permit the valve barrels to be assembled in two or more different angular orientations.

According to another aspect of the invention, an anti-wear coating is disposed on the peripheral surface of the barrel.

According to another aspect of the invention, at least one hole is formed in each valve barrel extending between the forward and aft end faces.

According to another aspect of the invention, the apparatus further includes a pulley coupled to the valve shaft.

According to another aspect of the invention, the apparatus further includes a cylindrical bearing surrounding each pair of connected stub shafts.

According to another aspect of the invention, the aperture has a racetrack cross-sectional shape.

According to another aspect of the invention, a modular rotary valve apparatus includes: the valve shaft above mounted for rotation in a cylinder head, the cylinder head including: at least one combustion chamber having an intake opening and an exhaust opening communicating therewith; an intake port; an exhaust port; and wherein one of the valve barrels is disposed between the intake opening and the intake port, and one of the valve barrels is disposed between the exhaust opening and the exhaust port.

According to another aspect of the invention, a modular rotary valve apparatus includes: first and second ones of the valve shaft above mounted for rotation side-by-side in a cylinder head, the cylinder head including: at least one combustion chamber having an intake opening and an exhaust opening communicating therewith; an intake port; an exhaust port; and wherein one of the valve barrels of the first valve shaft is disposed between the intake opening and the intake port, and one of the valve barrels of the second valve shaft is disposed between the exhaust opening and the exhaust port.

According to another aspect of the invention, the cylinder head includes a plurality of valve barrel recesses, each valve barrel recess receiving one valve barrel.

According to another aspect of the invention, the cylinder head has upper and lower sections, each section including valve barrel recesses and bearing recesses formed therein, wherein the valve barrel recesses of the upper section are aligned with corresponding valve barrel recesses of the lower section.

According to another aspect of the invention, a method of assembling a modular rotary valve apparatus includes: determining a selected angular orientation of a plurality of separate valve barrels, each valve barrel having an annular peripheral surface extending between forward and aft end faces, and an aperture extending transversely therethrough communicating with the peripheral surface on opposite side; and coupling the valve barrels to each other in an end-to-end arrangement along an axis so as to define a valve shaft with each valve barrel being in the selected angular orientation.

According to another aspect of the invention, the step of coupling the valve barrels includes engaging mechanical alignment features of adjacent valve barrels.

According to another aspect of the invention, the mechanical alignment features are configured to permit the valve barrels to be assembled in two or more predetermined angular orientations, and the selected angular orientation is one of the predetermined angular orientations.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
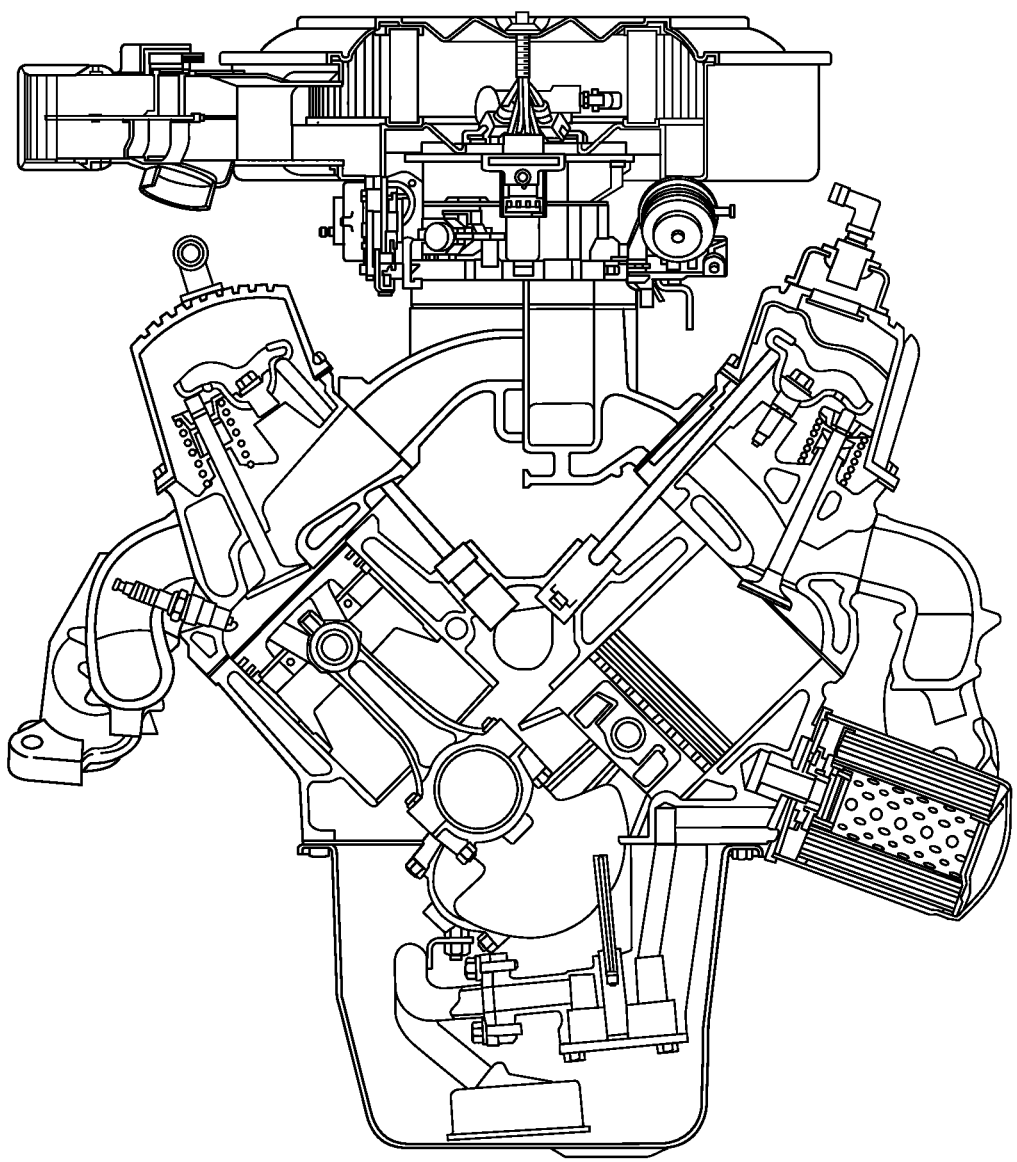
FIG. 1 is a schematic cross-sectional view of a prior art internal combustion engine.
Figure 2:
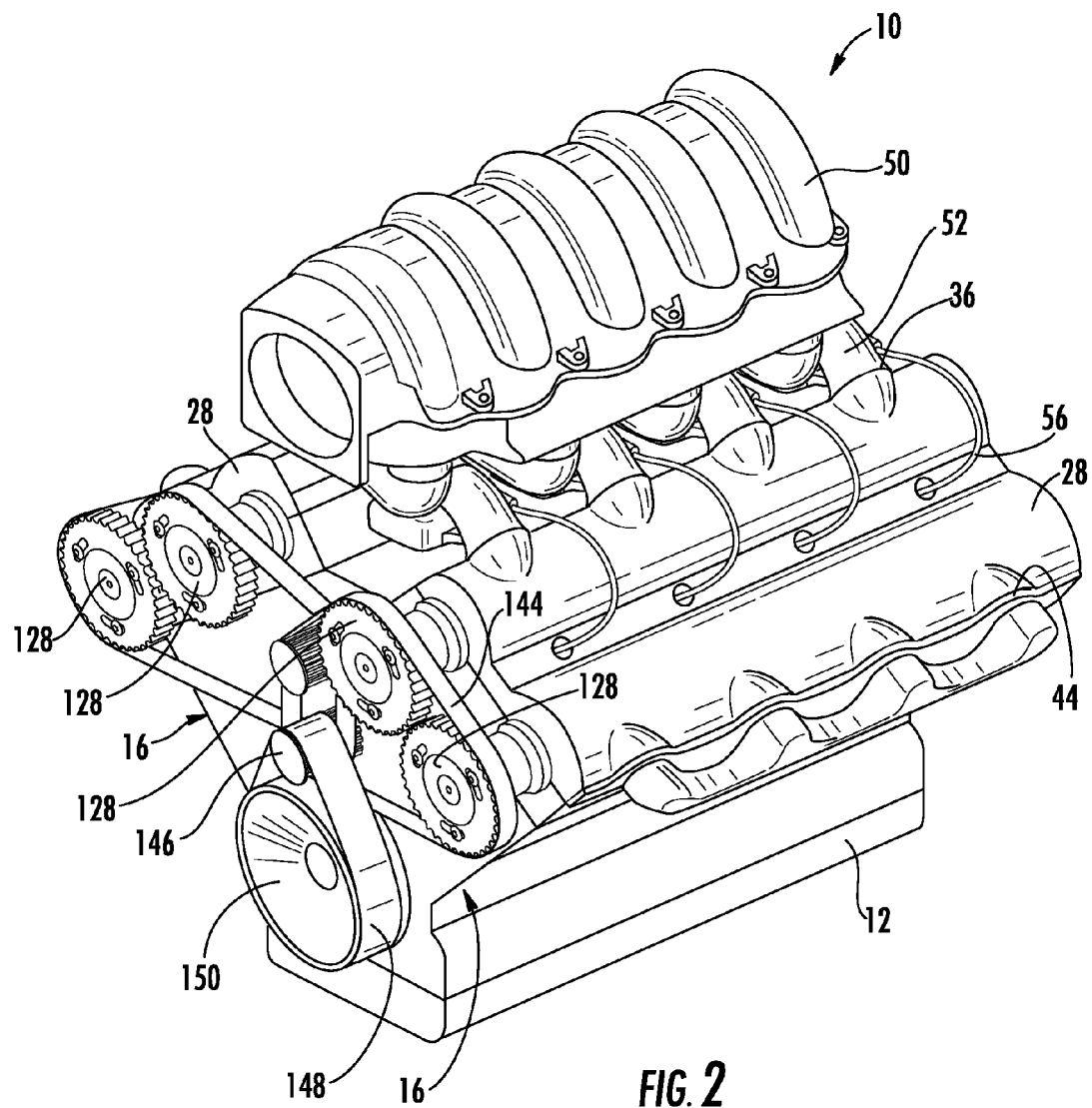
FIG. 2 is a schematic perspective of an internal combustion engine constructed in accordance with an aspect of the present invention.
Figure 3:
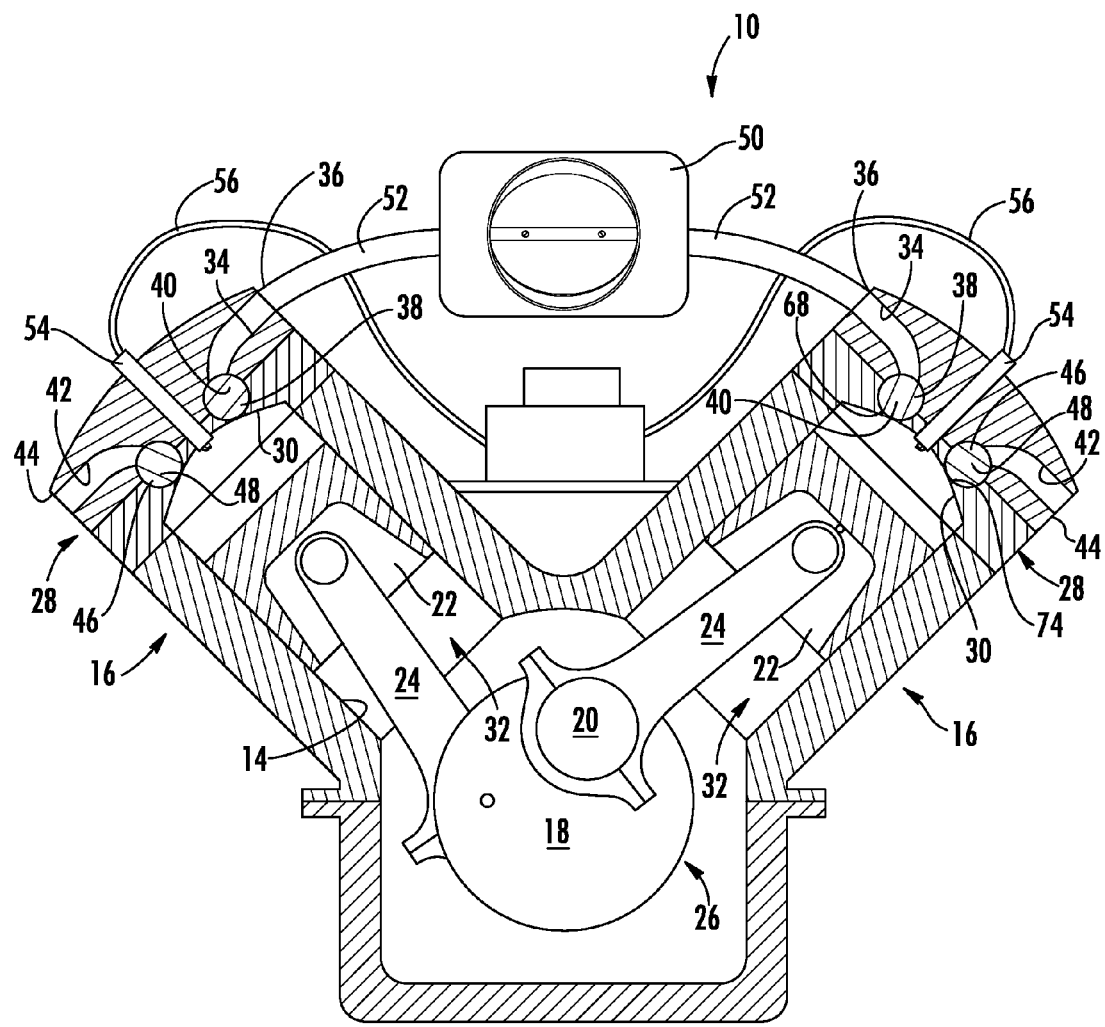
FIG. 3 is a cross-sectional view of the internal combustion engine of FIG. 1.

Referring to the drawings wherein identical reference numerals denote the same elements throughout the various views, FIGS. 2 and 3 illustrate an exemplary internal combustion engine 10 constructed according to an aspect of the present invention.

The illustrated example is an eight-cylinder engine 10 of vee configuration, commonly referred to as a "V-8", with two banks of four cylinders set 90 degrees to each other. However, it will be understood that the principles of the present invention are applicable to any internal combustion engine, for example engines running various cycles such as Otto or Diesel cycles, or similar machines requiring valves to open and close fluid flow ports.

The engine includes a block 12 which serves as a structural support and mounting point for the other components of the engine 10. Generally cylindrical cylinder bores 14 are formed within the block 12. As noted above the cylinder bores 14 are arranged in two longitudinal cylinder banks 16 of four cylinder bores 14 each. A crankshaft 18 having offset crankpins 20 is mounted in the block 12 for rotation in suitable bearings. A piston 22 is disposed in each cylinder bore 14, and each piston 22 is connected to one of the crankpins 20 by a piston rod 24. The crankshaft 18, piston rods 24, and pistons 22 collectively define a rotating assembly 26. In operation, gas pressure in the cylinder bores 14 causes linear movement of the pistons 22, and the rotating assembly 26 is operable in a known manner to convert linear movement of the pistons to rotation of the crankshaft.

The engine includes one cylinder head assembly 28 attached to each cylinder bank 16. The cylinder head assembly 28 has a generally concave combustion chamber 30 formed therein corresponding to and aligned with each cylinder bore 14. Collectively, each cylinder bore 14 and the corresponding combustion chamber 30 defines a cylinder 32.

The cylinder head assembly 28 has a plurality of intake ports 34 formed therein; each intake port 34 extends from one of the combustion chambers 30 to an intake plane 36 at an exterior surface of the cylinder head assembly 28. As will be described in detail below, an intake valve barrel 38 is disposed across each intake port 34 and includes an intake aperture 40 passing therethrough. The intake port 34, intake valve barrel 38, and intake aperture 40 are arranged such that in a first angular orientation of the intake valve barrel 38, fluid flow is permitted between the intake plane 36 and the combustion chamber 30, and at a second angular orientation of the intake valve barrel 38, fluid flow is blocked between the intake plane 36 and the combustion chamber 30.

The cylinder head assembly 28 also includes a plurality of exhaust ports 42 formed therein; each exhaust port 42 extends from one of the combustion chambers 30 to an exhaust plane 44 at an exterior surface of the cylinder head assembly 28. As will be described in detail below, an exhaust valve barrel 46 is disposed across each exhaust port 42 and includes an exhaust aperture 48 passing therethrough. The exhaust port, exhaust valve barrel 46, and exhaust aperture 48 are arranged such that in a first angular orientation of the exhaust valve barrel 46, fluid flow is permitted between the exhaust plane 44 and the combustion chamber 30, and at a second angular orientation of the exhaust valve barrel 46, fluid flow is blocked between the exhaust plane 44 and the combustion chamber 30.

The engine 10 includes a fuel delivery system 50 which is operable to receive an incoming airflow, meter a hydrocarbon fuel such as gasoline into the airflow to generate a combustible intake mixture, and deliver the intake mixture to the cylinders 32.

The fuel delivery system 50 may be continuous flow or intermittent flow, and the fuel injection point may be at the individual cylinders 32 or at an upstream location. Optionally the fuel injection point may be within the cylinders 32, a configuration commonly referred to as "direct injection", in which case the intake ports 34 deliver only air to the cylinders 32. Known types of fuel delivery systems include carburetors, mechanical fuel injection systems, and electronic fuel injection systems. The specific example illustrated is an electronic fuel injection system with one intake runner 52 connected to each intake port 34.

The engine 10 includes an ignition system comprising one or more spark plugs 54 mounted in each combustion chamber 30, to ignite the intake mixture. An appropriate ignition power source is provided, such as a conventional Kettering ignition system with a coil and distributor, or a direct ignition system with a trigger module and multiple coils.

The ignition power source is connected to the spark plugs 54, for example with leads 56.

Figure 4:
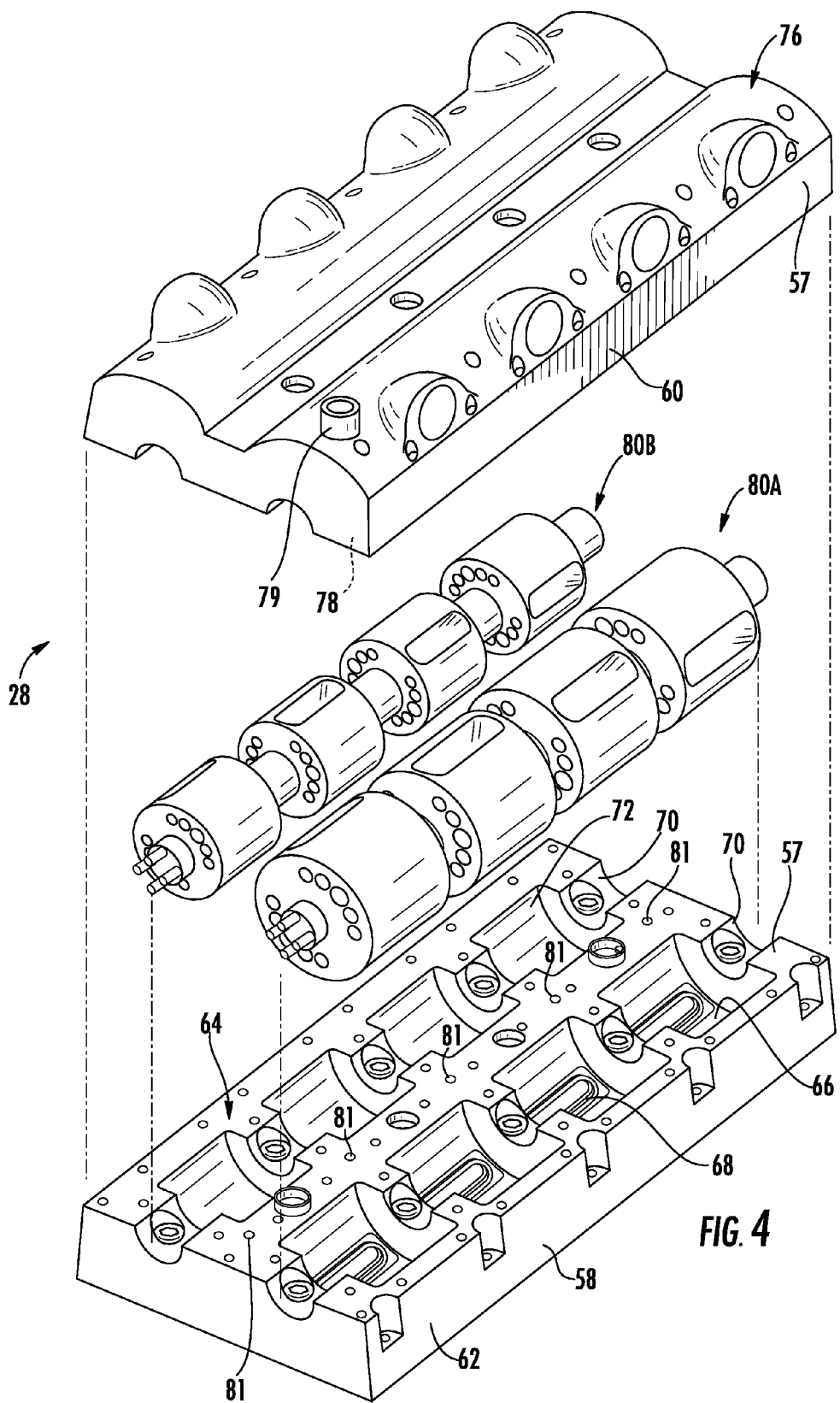
FIG. 4 is an exploded perspective view of a cylinder head assembly of the engine shown in FIG. 2.

FIG. 4 is an exploded view of one of the cylinder head assemblies 28. The cylinder head assembly 28 includes one or more stationary components that are configured to be mounted to the cylinder bank 16 and to enclose the operating parts. The cylinder head assembly 28 includes a cylinder head 57. In the illustrated example, the cylinder head 57 is made up of a lower section 58 attached to an upper section 60 with bolts. Alternatively, the cylinder head 57 could be made from a single block.

Figure 5:
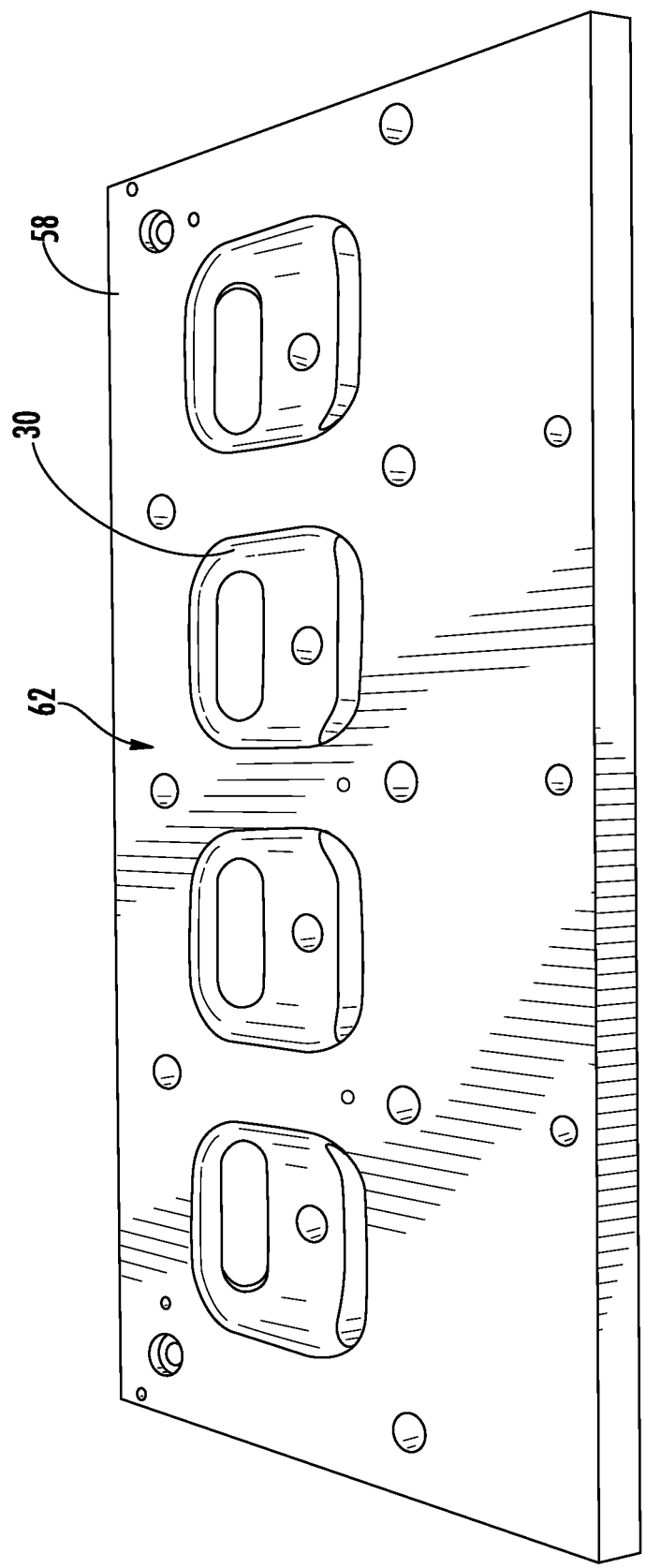
FIG. 5 is a bottom plan view of a lower section of the cylinder head assembly of FIG. 4.

The lower section 58 is a block-like element which may be formed by casting or machining from billet. It includes an exterior surface 62 which incorporates the combustion chambers 30 (see FIG. 5), and an opposed interior surface 64. Adjacent the interior surface 64, the lower section 58 has a plurality of semi-cylindrical intake barrel recesses 66 formed therein, arranged in a longitudinal line. Each intake barrel recess 66 communicates with an intake opening 68. A plurality of semi-cylindrical bearing recesses 70 alternate with the intake barrel recesses. The lower section 58 also has a plurality of semi-cylindrical exhaust barrel recesses 72 formed therein, arranged in a longitudinal line. Each exhaust barrel recess 72 communicates with an exhaust opening 74 (see FIG. 3). A plurality of semi-cylindrical bearing recesses 70 alternate with the exhaust barrel recesses 72.

Figure 6:
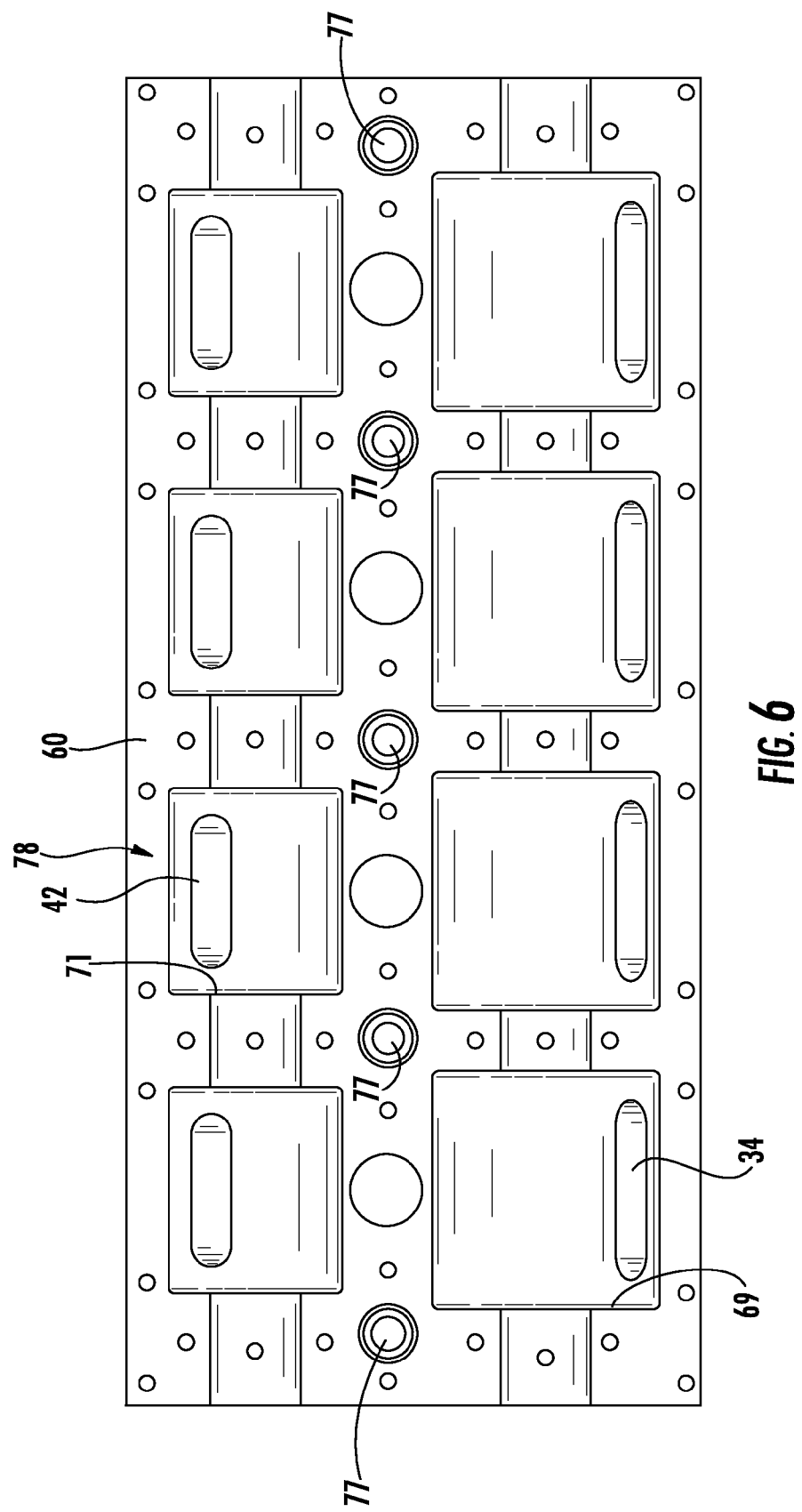
FIG. 6 is a bottom plan view of a upper section of the cylinder head assembly of FIG. 4.

The upper section 60 is also a block-like element which may be formed by casting or machining from billet. It includes an exterior surface 76, and an opposed interior surface 78 which mates with the interior surface 64 of the lower section 58. The intake ports 34 described above are formed as part of the upper section 60. Adjacent the interior surface 78, the upper section 60 has a plurality of semi-cylindrical intake barrel recesses 69 formed therein, arranged in a longitudinal line (see FIG. 6). Each intake barrel recess 69 communicates with one of the intake ports 34. A plurality of semi-cylindrical bearing recesses 70 alternate with the intake barrel recesses 69. The lower section 58 also has a plurality of semi-cylindrical exhaust barrel recesses 71 formed therein, arranged in a longitudinal line. Each exhaust barrel recess 71 communicates with one of the exhaust ports 42. A plurality of semi-cylindrical bearing recesses 70 alternate with the exhaust barrel recesses 71.

Provisions made be incorporated for liquid cooling all or part of the cylinder head 57. In the illustrated example, the upper section 60 includes a hollow interior chamber (not shown) disposed between the interior surface 78 and the exterior surface 76. A series of coolant inlet holes 77 (FIG. 6) are formed in the interior surface 78 and communicate with the interior chamber. A coolant outlet 79 (see FIG. 4) is formed in the exterior surface 76. In operation, a suitable liquid coolant, such as water or water mixed with an antifreeze agent, is supplied to the coolant inlet holes 77 through matching coolant transfer holes 81 in the interior surface 64 of the lower section 58. The coolant circulates through the interior chamber, absorbing heat, and is then passed out through the coolant outlet 79. It may then be cooled, for example using a conventional radiator (not shown), and recirculated for reuse.

The lower section 58 and upper section 60 receive an intake valve shaft 80A and an exhaust valve shaft 80B. The valve shafts 80A and 80B are generally similar in construction to each other, with the intake valve shaft 80 being slightly larger in scale. The construction of the intake valve shaft 80A will be described in detail, with the understanding that the details are applicable to both of the valve shafts 80A, 80B.

It is also noted that, while the illustrated example includes inlet and exhaust valve shafts 80A and 80B, it should be appreciated that the modular valve shaft construction described herein could also be applied to a single valve shaft having both intake and exhaust valve barrels, or to valve barrels having both intake and exhaust apertures therein.

Figure 7:
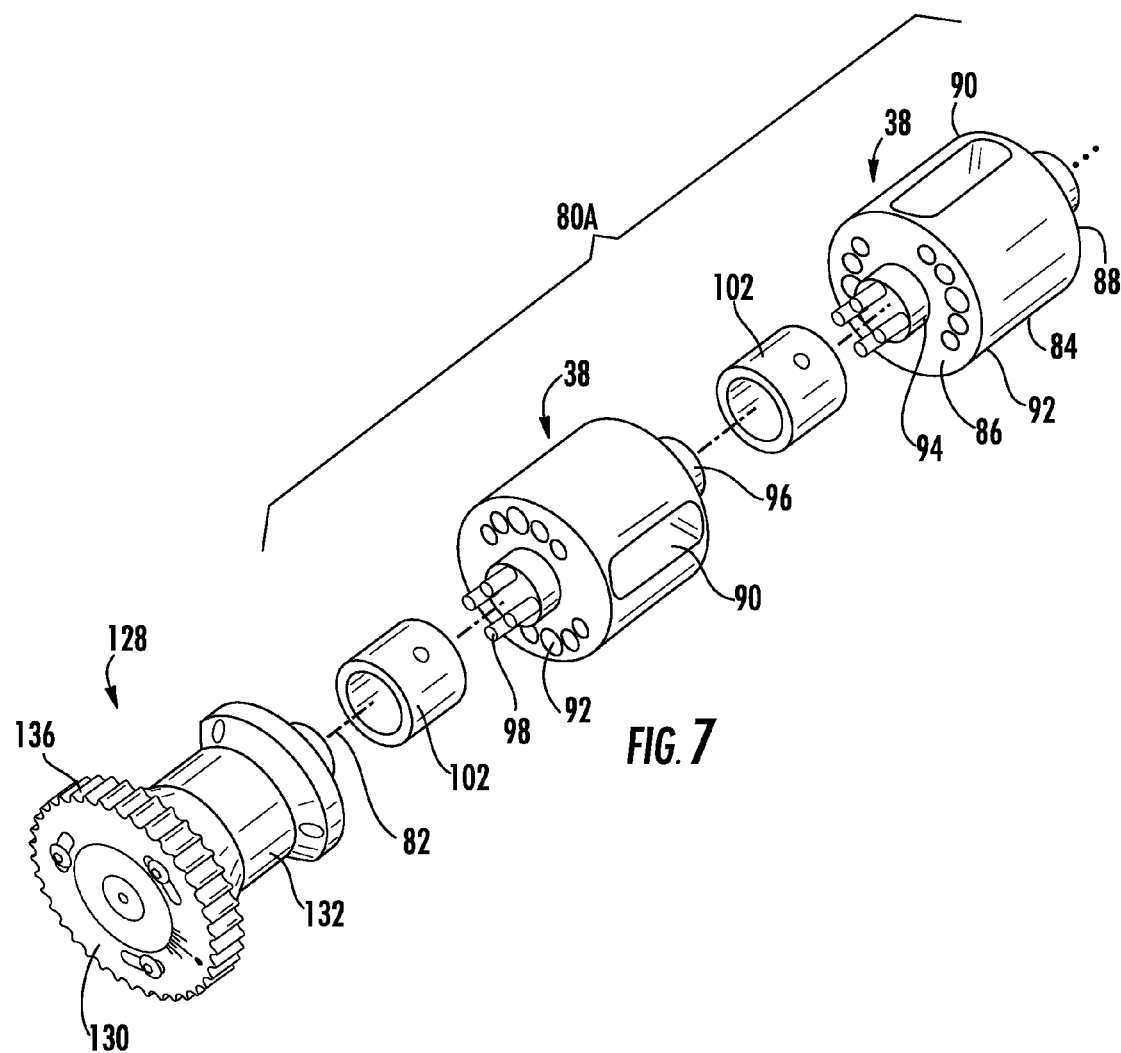
FIG. 7 is an exploded perspective view of a valve shaft assembly.

Referring to FIG. 7, The intake valve shaft 80A includes a plurality of intake valve barrels 38 laid out along an axis 82. Each intake valve barrel 38 is a generally cylindrical element with an annular peripheral surface 84 extending between forward and aft end faces 86, 88. An intake aperture 90 extends transversely through the intake valve barrel 38, communicating with the peripheral surface 84 on opposite sides. The cross-sectional flow area of the aperture 90 is constant over its length. In the illustrated example the intake aperture 90 has a "racetrack" cross-sectional shape, with two parallel sides connected by two semicircular ends. Other cross-sectional shapes may be used.

The lateral dimension of the intake aperture 90 (perpendicular to the axis 82), the diameter of the intake valve barrel 38, and the rotational speed of the intake valve shaft 80A relative to the crankshaft speed all effect the valve open time or "duration", and these effects are inter-related. This is also true for the exhaust valve barrels 46. These variables may be manipulated in order to adapt the intake valve shaft 80A and/or exhaust valve shaft 80B to suit a particular application. For example, the intake valve barrels 38 could be a different diameter than the exhaust valve barrels 46. In one non-limiting example, the ratio of the diameter of the intake valve barrels 38 to the diameter of the exhaust valve barrels 46 could be about 1:1 to about 4:1.

The intake valve barrel 38 may be made from a rigid, wear-resistant material such as a metal alloy or ceramic. A wear coating such as ceramic or carbide may be applied to all or part of the intake valve barrel 38, particularly the peripheral surface 84, to improve its wear properties.

Optionally, longitudinal holes 92 or other openings may be formed in the intake valve barrel 38 extending between the forward and aft end faces 86, 88. These holes 92 may be used to reduce the mass of the intake valve barrel 38, for balancing purposes, and/or to provide a cooling air flow.

A cylindrical forward stub shaft 94 extends from the forward end face 86, and a cylindrical aft stub shaft 96 extends from the aft end face 88.

Figure 8:
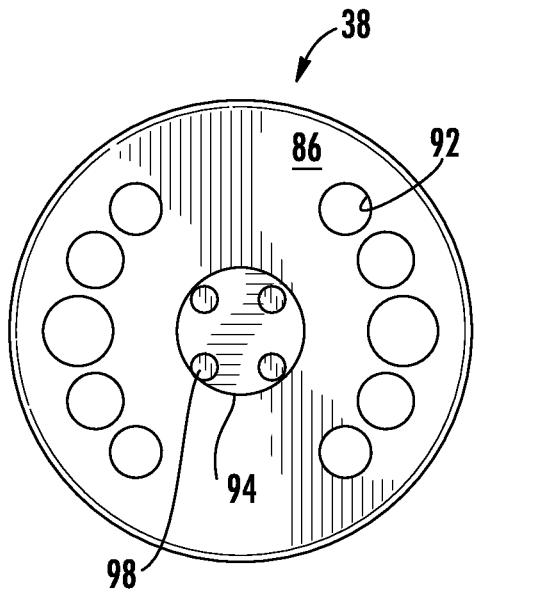
FIG. 8 is a front elevational view of a valve barrel.
Figure 9:
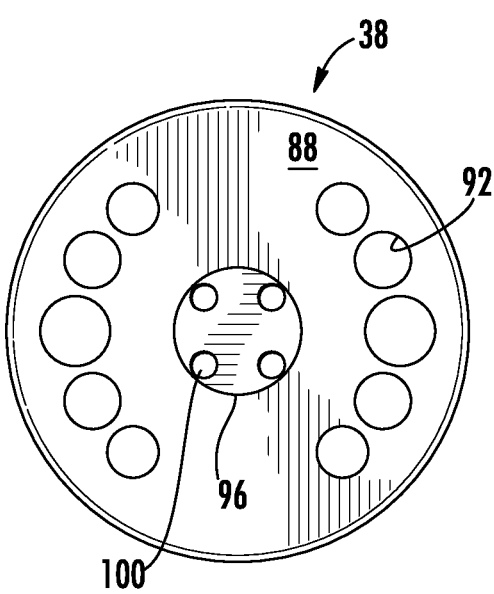
FIG. 9 is a rear elevational view of a valve barrel.

The stub shafts 94, 96 may include mating mechanical alignment features to transfer torque between two adjacent intake valve barrels 38 and to maintain a specific angular relationship therebetween. For example, the forward stub shaft 94 may include a ring of axial pins 98 (FIG. 8), and the aft stub shaft may include a ring of corresponding drive holes 100 (FIG. 9). The intake valve shaft 80A can be "built up" in a modular fashion by inserting the axial pins 98 of each intake valve barrel 38 into the drive holes 100 of the adjacent intake valve barrel 38. It will be understood that the intake aperture 90 of each intake valve barrel 38 must have a specific angular orientation which is dependent on the cylinder firing sequence of the engine 10. The mechanical alignment feature described above may be configured so that any intake valve barrel 38 may be used in any location within the intake valve shaft 80A, that is, the mechanical alignment feature may accommodate multiple angular alignments, or alternatively the mechanical alignment feature may be configured to produce only a single angular alignment, in which case each intake valve barrel 38 would need to be placed in a specific location within the intake valve shaft 80A.

Optionally, the valve stub shafts 94, 96 could be connected to each other using fasteners, a mechanical interlock, or a bonding method such as welding or structural adhesives. Also, alternatively, the valve shaft 80 could be manufactured as a single integral component instead of being built up from individual intake valve barrels 38.

Figure 10:
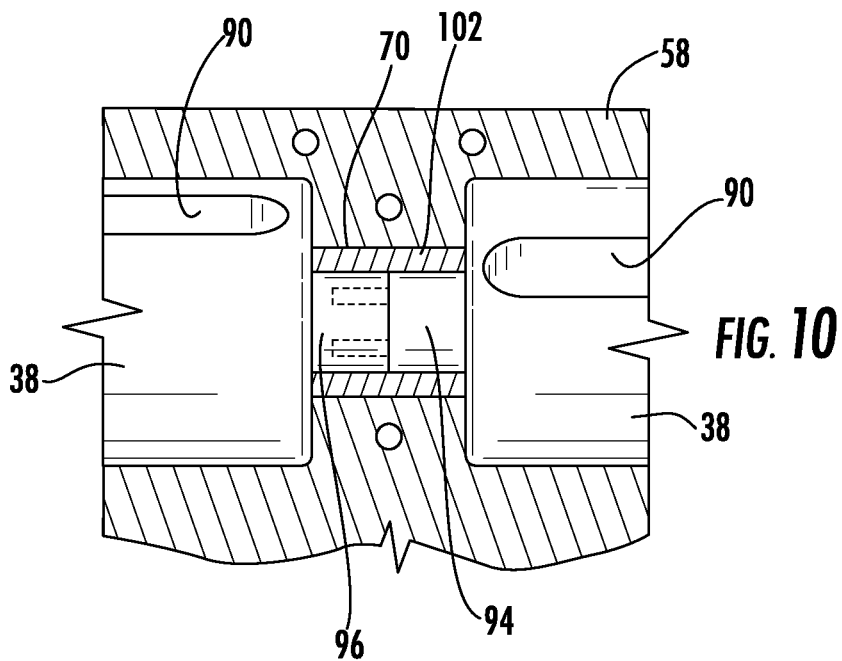
FIG. 10 is a cross-sectional view of a portion of the cylinder head assembly of FIG. 4, showing a valve shaft assembly installed therein.

As seen in FIGS. 7 and 10, the intake valve shaft 80A is provided with a plurality of bearings 102. In the illustrated example, the bearings are simple cylinders. They may be configured as plain bearings or bushings, and made of a self-lubricating material, or they may be configured as hydrodynamic bearings and provided with a pressurized oil supply. Alternatively, rolling element bearings could be used. The bearings 102 may be installed over the stub shafts 94, 96 when the intake valve shaft 38 is built up, and then installed into the bearing recesses 70 of the lower section 58 and the upper section 60. Alternatively, the bearings 102 could be provided as split shells instead of fully annular components.

Figure 11:
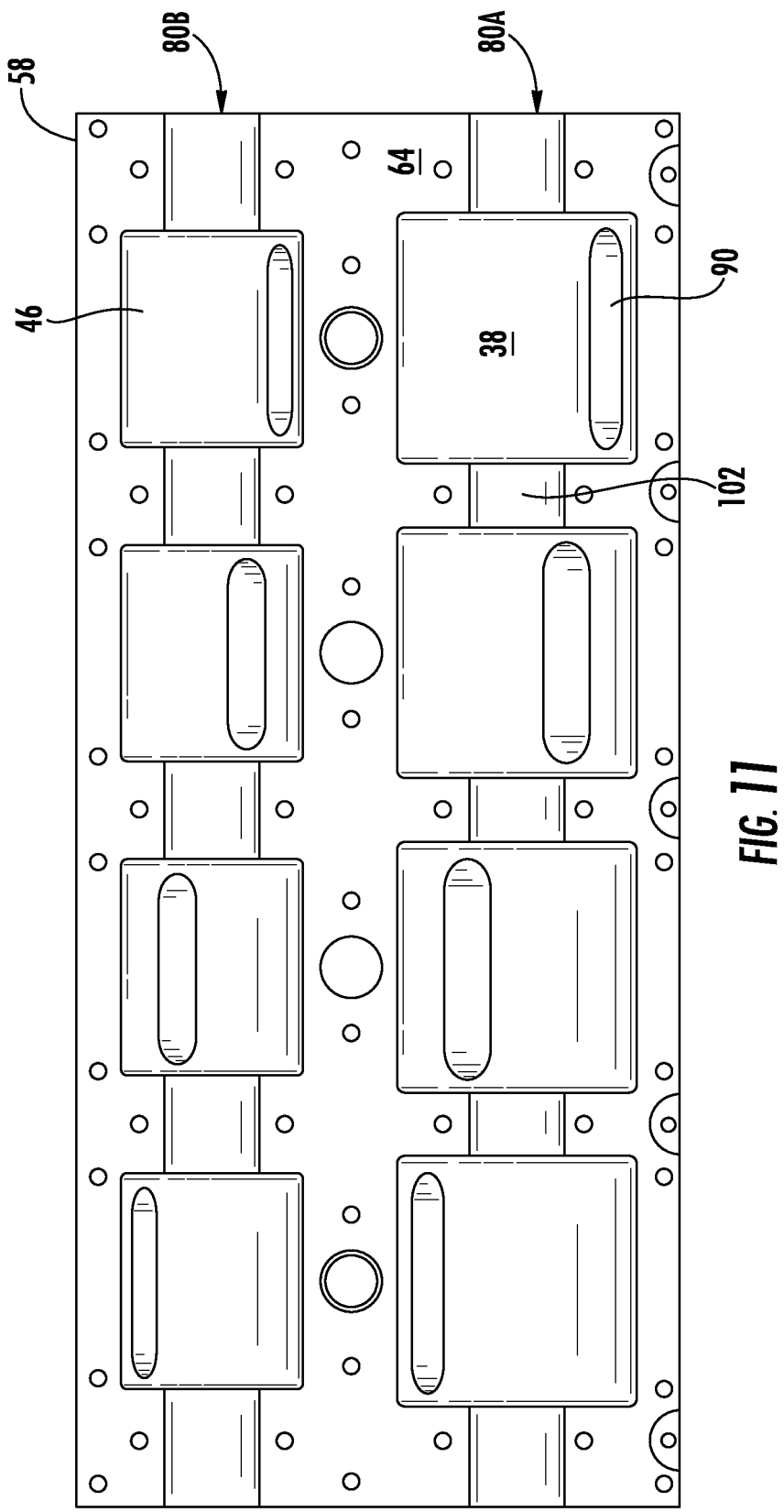
FIG. 11 is a top plan view of a cylinder head assembly shown in FIG. 4, with valve shafts installed therein.
Figure 12:
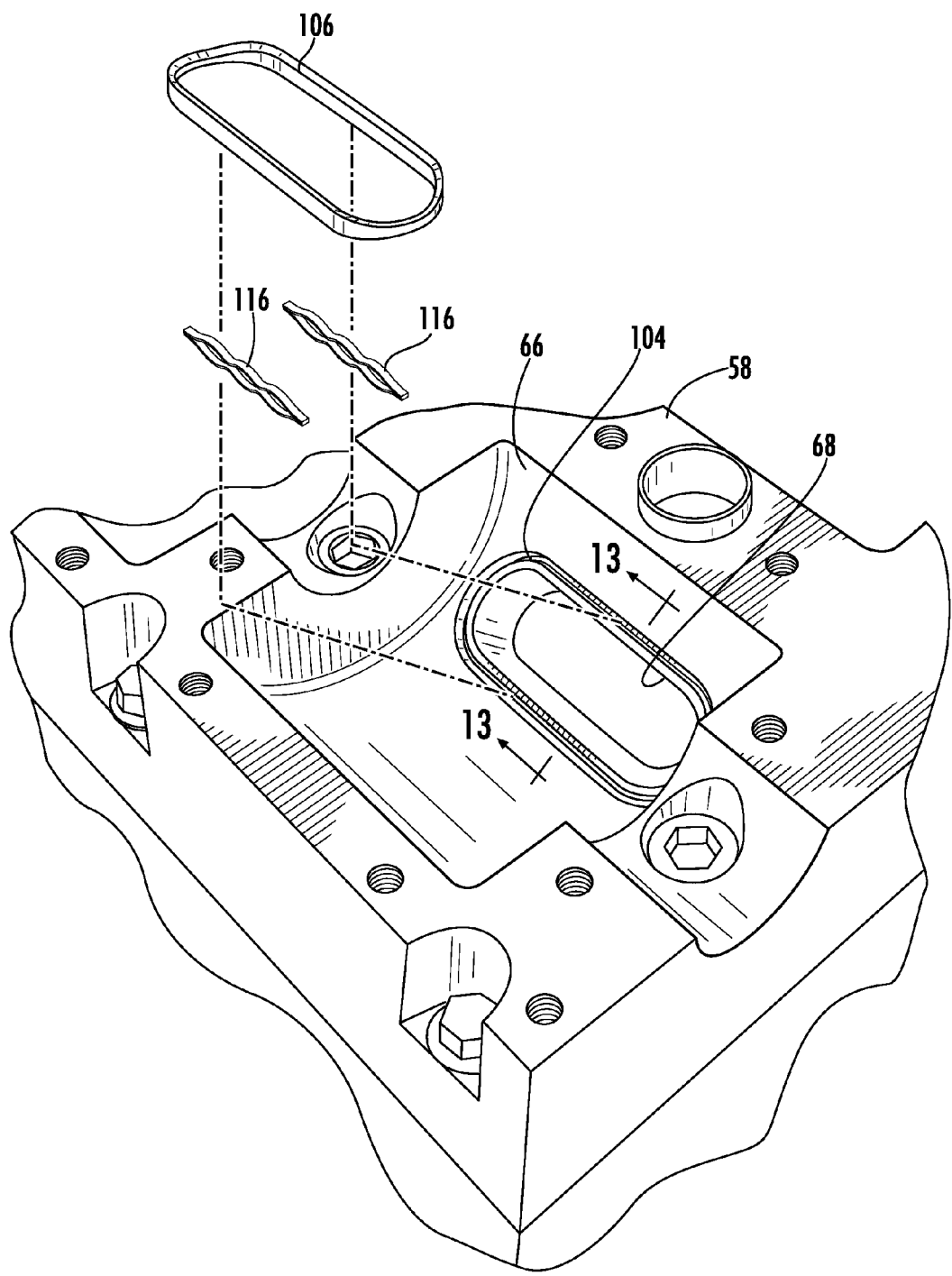
FIG. 12 is an exploded perspective view of a portion of the cylinder head assembly shown in FIG. 4, showing a first embodiment thereof.

When assembled, the intake valve shaft 80A and exhaust valve shaft 80B are received in the bearing recesses 70 and barrel recesses 66, 72, and are clamped between the lower section 58 and the upper section 60, which may be coupled together using conventional fasteners (not shown). The intake and exhaust valve shafts 80A, 80B are then free to rotate within the cylinder head assembly 28. FIG. 11 shows the valve shafts 80A, 80B installed in the lower section 58.

As noted above, each intake barrel recess 66 communicates with an intake opening 68, and each exhaust barrel recess 72 communicates with an exhaust opening 74. Each of these openings incorporates a sealing assembly. A single sealing assembly at one of the intake openings 68 will be described in general with reference to FIGS. 12-18, with the understanding that this description is applicable to all of the sealing assemblies, both intake and exhaust.

A seal slot 104 is formed around the periphery of the intake opening 68. A seal 106 is received in the seal slot 104 and operates to reduce or prevent leakage between the cylinder 32 and the intake valve barrel 38.

Figure 14:
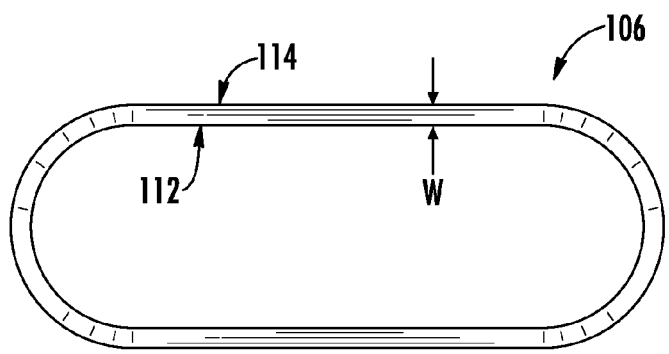
FIG. 14 is a top plan view of a seal constructed in accordance with an aspect of the present invention.
Figure 15:
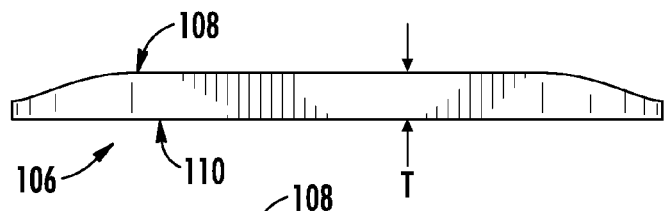
FIG. 15 is a side elevation view of the seal of FIG. 14.
Figure 16:
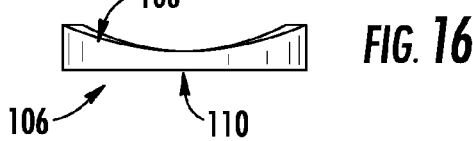
FIG. 16 is a front elevation view of the seal of FIG. 14.

The seal 106 is shown in more detail in FIGS. 14-16. The seal 106 is generally in the shape of an elongated ring and includes a sealing face 108, an opposed back face 110, an inner peripheral face 112, and an outer peripheral face 114. In plan view the seal has a racetrack shape, with two long sides connected by semicircular ends. A width "W" of the seal, measured between the inner and outer peripheral faces 112 and 114, is selected to be slightly less than a corresponding width of the seal slot 104 so as to allow the seal to slide relative to the seal slot 104. As seen in FIG. 16, the sealing face 108 has a concave curvature which matches the curvature of the peripheral surface 84 of the intake valve barrel 38. The thickness "T" of the seal 106, measured between the sealing face 108 and the back face 110, is constant along the sides of the racetrack shape, tapering to a smaller thickness at the semicircular ends.

The seal 106 may be made from a rigid, wear-resistant material such as a metal alloy or ceramic. A wear coating such as ceramic or carbide may be applied to all or part of the seal 106 to improve its wear properties.

Figure 13:
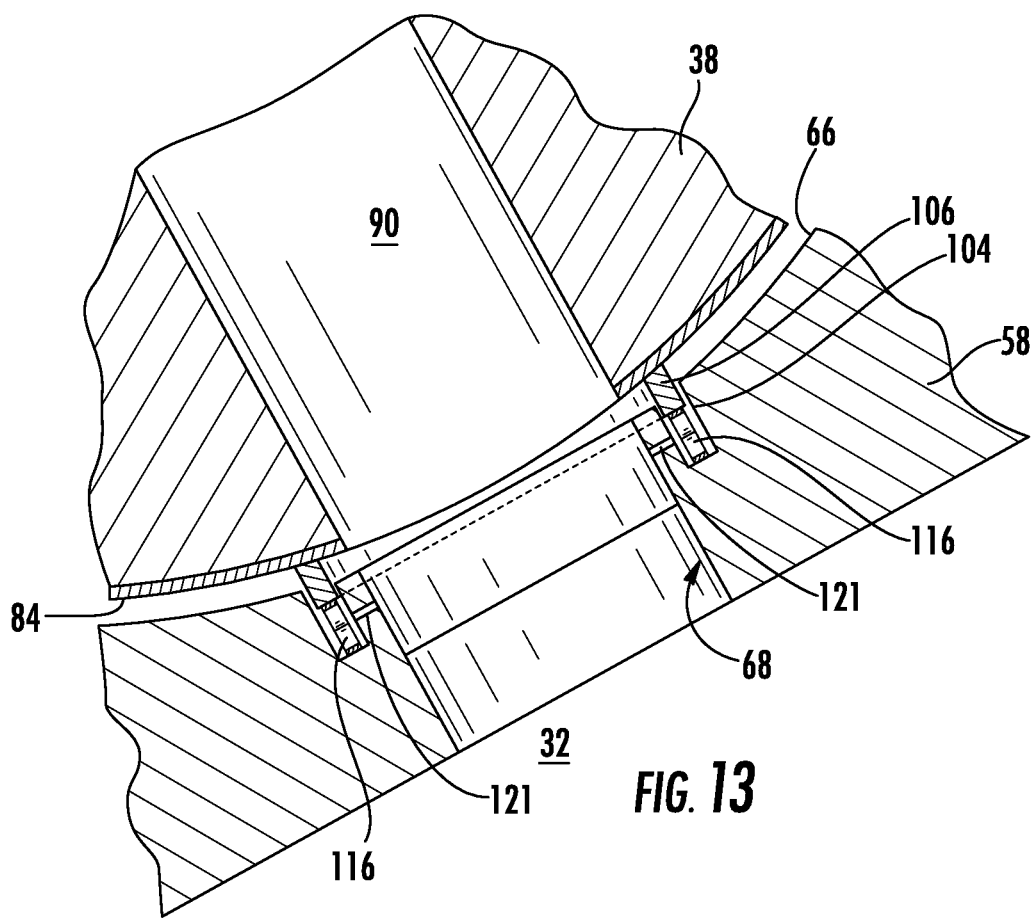
FIG. 13 is a view taken along lines 13-13 of FIG. 12.
Figure 17:
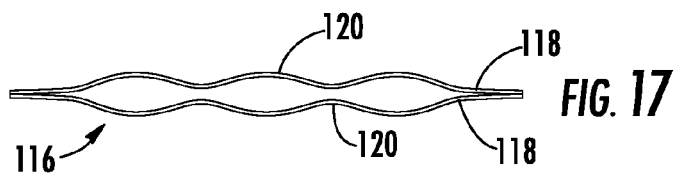
FIG. 17 is a side elevation view of a seal spring constructed in accordance with an aspect of the present invention.
Figure 18:
FIG. 18 is a front elevation view of the seal shown in FIG. 17.
Figure 22:
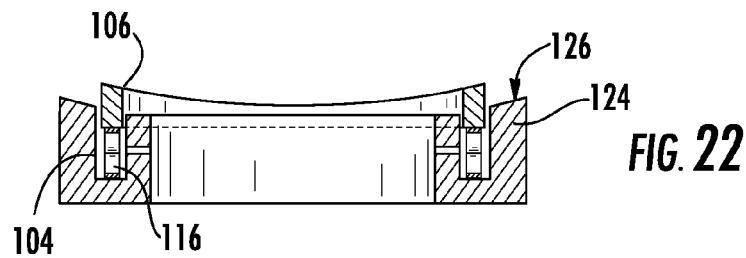
FIG. 22 is a view taken along lines 22-22 of FIG. 21.
Figure 21:
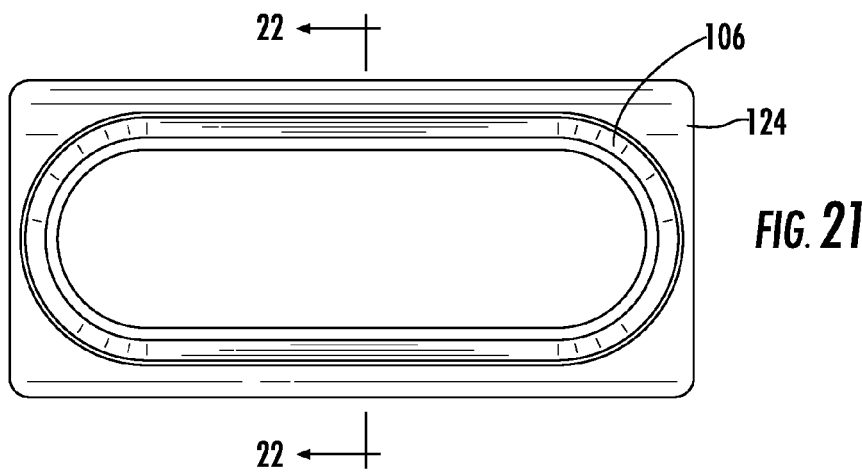
FIG. 21 is a top plan view of a seal shoe constructed in accordance with an aspect of the present invention.
Figure 19:
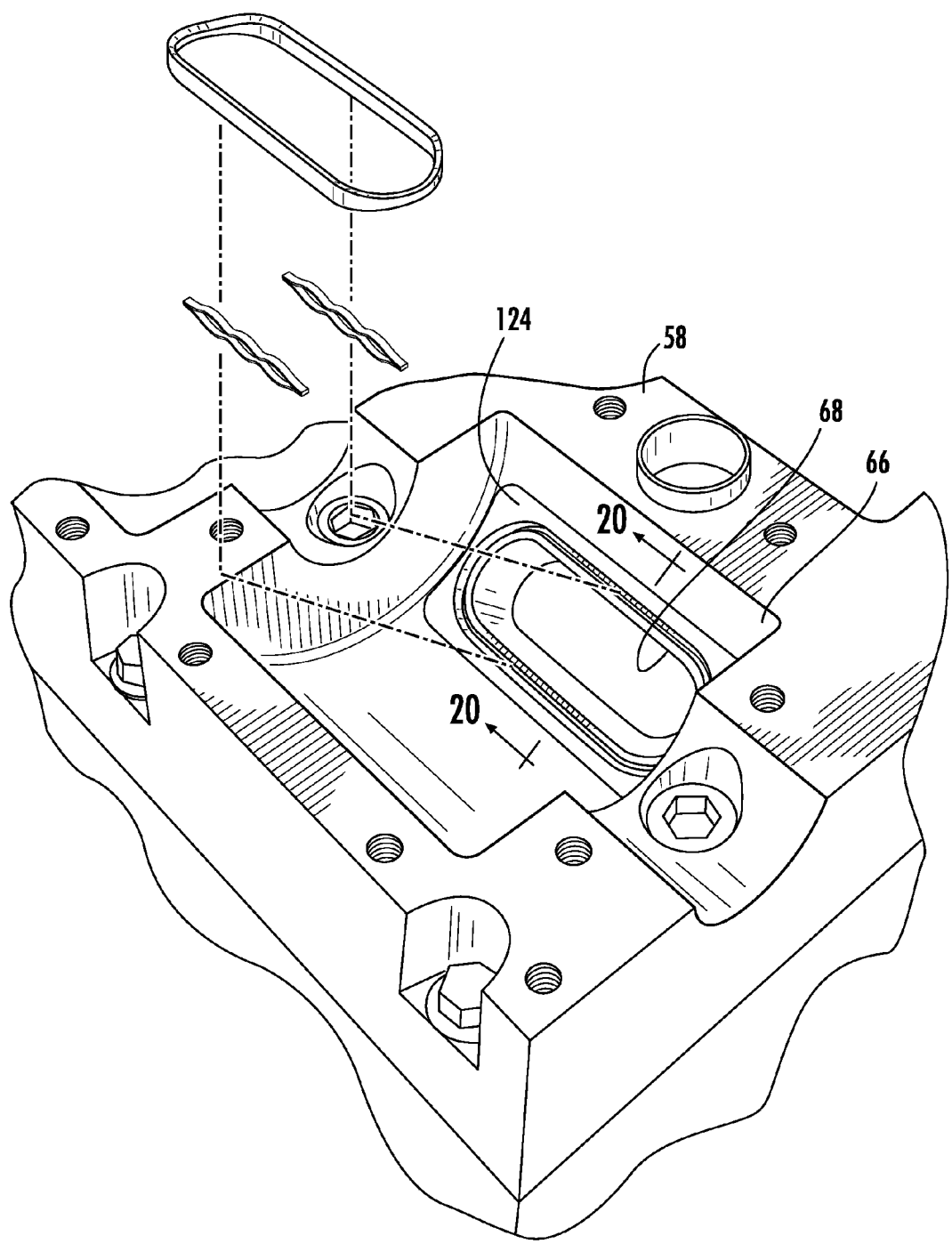
FIG. 19 is an exploded perspective view of a portion of the cylinder head assembly shown in FIG. 4 showing a second embodiment thereof.
Figure 20:
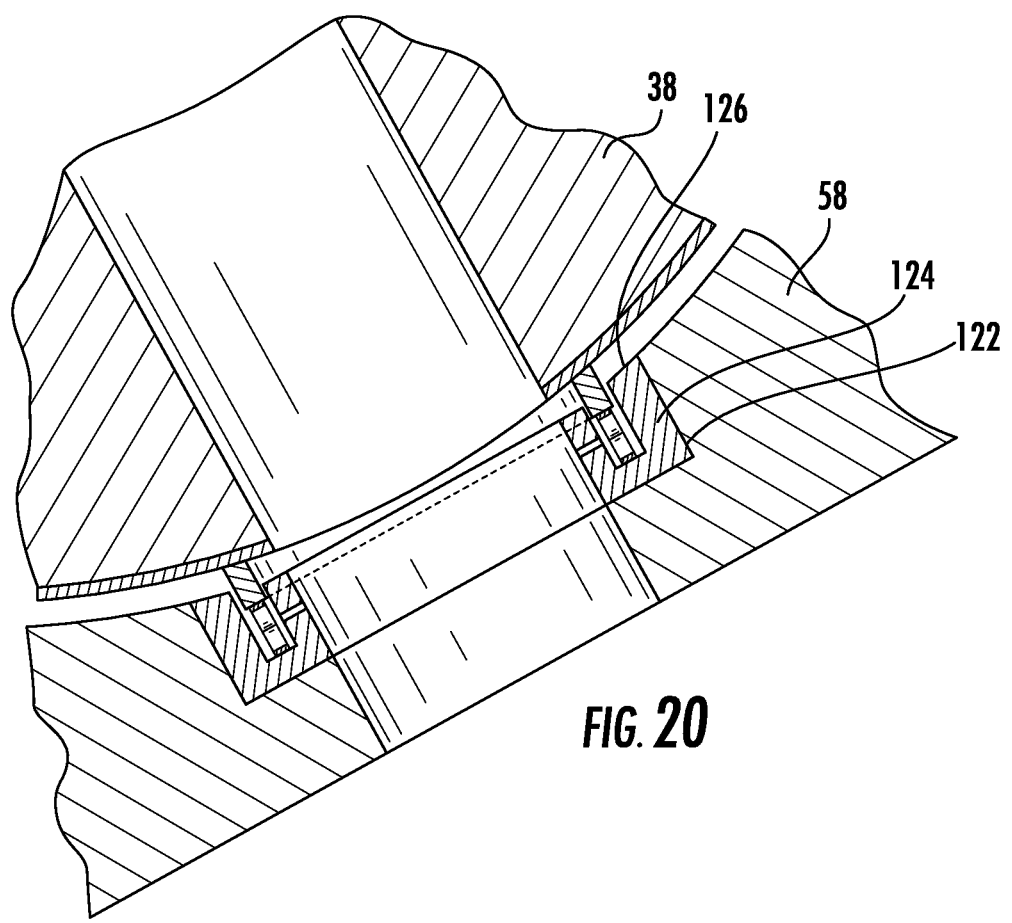
FIG. 20 is a view taken along lines 20-20 of FIG. 19.

A pair of seal springs 116 are disposed in the seal slot 104 underneath the seal 106. As shown in FIGS. 17 and 18, the seal springs 116 are elongated and may be made from a pair of strips 118 of spring steel, each having one or more waves or undulations 120 formed therein. The strips 118 may be attached to each other by brazing or other suitable bonding method. As seen in FIG. 13, the seal springs 116 urge the seal 106 outwards relative to the seal slot 104 and into contact with the peripheral surface 84 of the intake valve barrel 38. The seal springs 116 are intended to provide a preload and maintain the seal 106 in the correct assembled position, but do not provide the primary energizing force of the seal 106.

As further seen in FIG. 13, the intake opening 68 has one or more small gas ports 121 formed therein that communicate with the seal slot 104. In operation, rising gas pressure in the cylinder 32 passes into the gas ports 121 and impinges the back face 110 of the seal 106, providing an energizing force which presses the sealing face 108 of the seal 106 into contact with the peripheral surface 84 of the intake valve barrel 38. This in turn resists fluid leakage between the sealing face 108 and the peripheral surface 84. As pressure in the cylinder 32 drops off, the force acting on the seal 106 drops off as well. This provides a "timed" sealing effect in which large forces on the seal 106 are applied only when needed, and also significantly reduces frictional sliding forces and wear between the seal 106 and the intake valve barrel 38.

The seal slot 104 described above may be machined directly into the lower section 58. However, optionally, as seen in FIGS. 19-22, the lower section 58 may have a pocket 122 formed therein around the intake opening 68. A shoe 124 is received in the pocket 122 and secured thereto, for example using fasteners, an interference fit, or a bonding process such as brazing or welding. The shoe 124 has an exterior surface 126 which defines a portion of the intake barrel recess 66 and is provided with a seal slot 104, seal 106, and seal springs 116 as described above. The function of the seal 106 is the same as described above.

Figure 23:
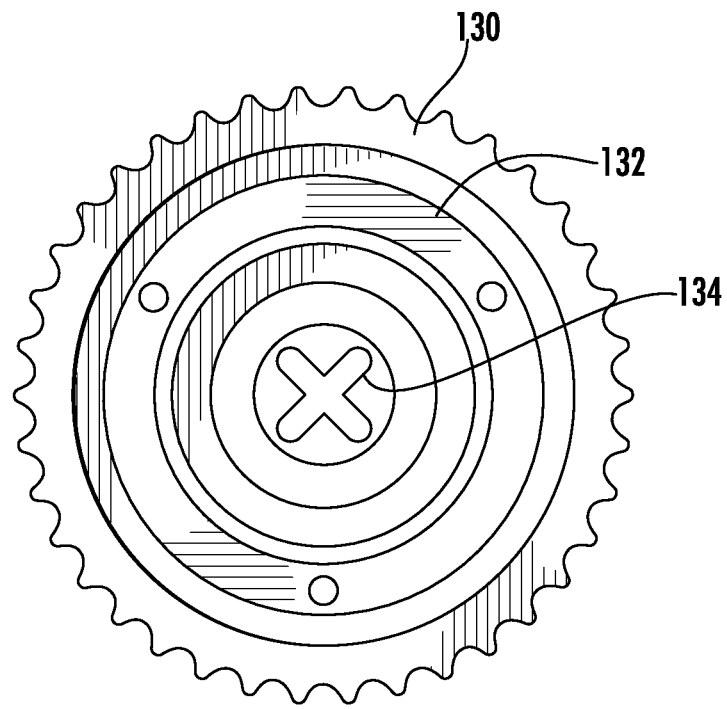
FIG. 23 is a front elevational view of a drive assembly.

In the assembled engine, a drive assembly 128 (FIG. 7) is provided for each valve shaft 80 which includes a pulley 130 and a coupler 132. The coupler 132 includes a mechanical alignment feature 134, such as the slots seen in FIG. 23, which is shaped and sized to mate with the mechanical alignment feature of the valve shaft 80, such as the axial pins 98 described above.

The pulley 130 is configured to engage a drive belt, chain, or similar transmission element. In the illustrated example the pulley 130 has teeth 136 around its periphery and is configured to engage a conventional toothed drive belt.

Figure 24:
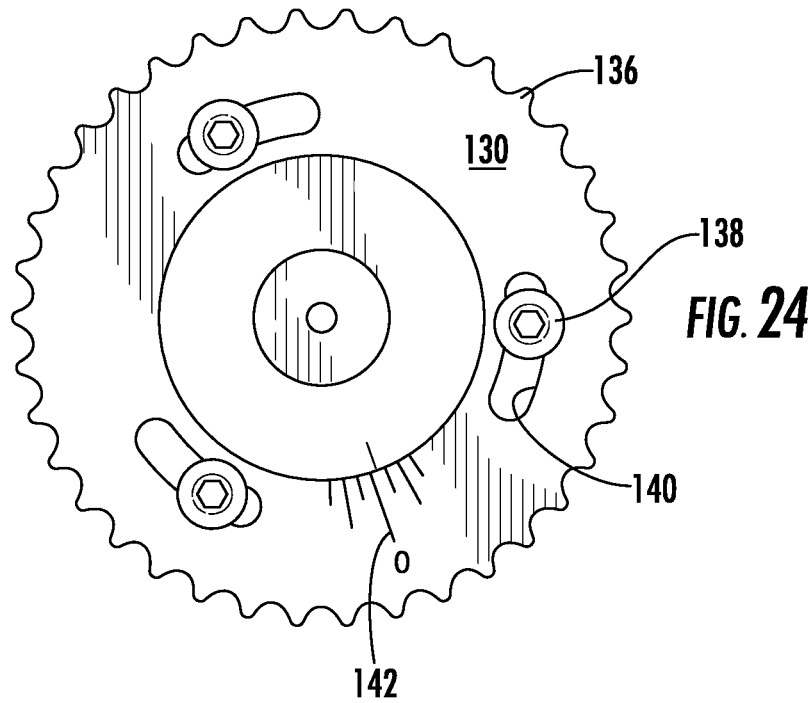
FIG. 24 is a rear elevational view of a drive assembly.
Figure 28:
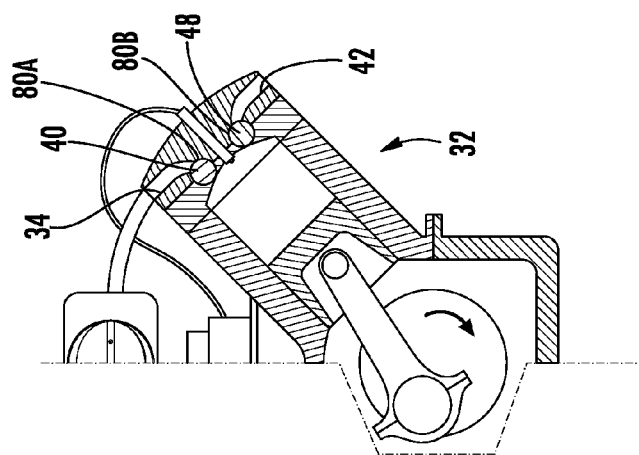
FIG. 28 is a schematic view of a portion of the engine in operation, during an exhaust stroke.
Figure 27:
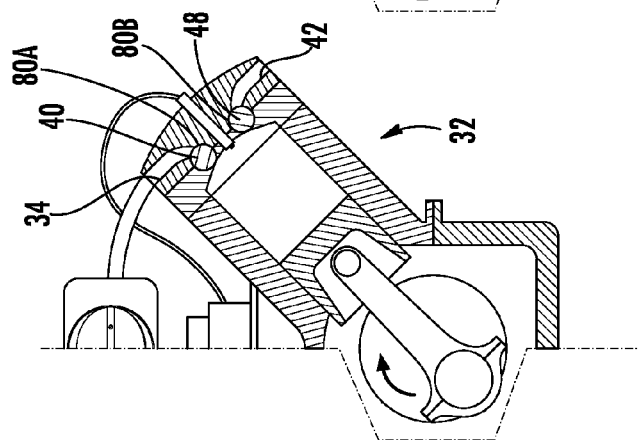
FIG. 27 is a schematic view of a portion of the engine in operation, during a power stroke.
Figure 26:
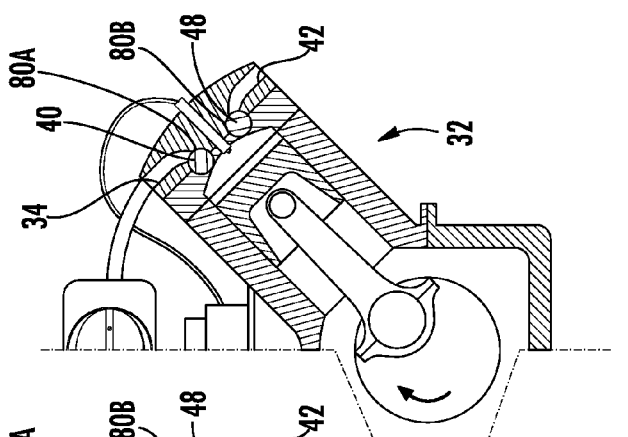
FIG. 26 is a schematic view of a portion of the engine in operation, during a compression stroke.
Figure 25:
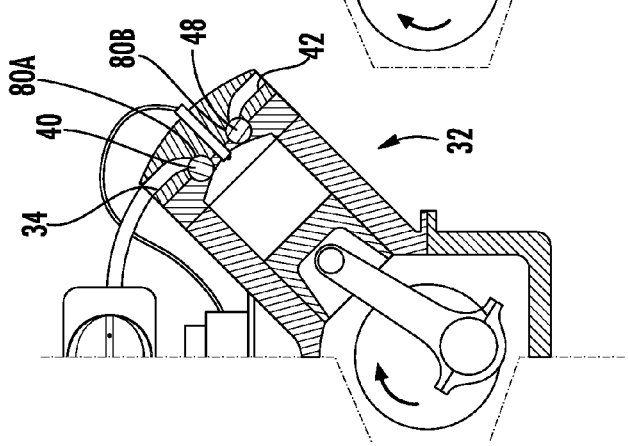
FIG. 25 is a schematic view of a portion of the engine in operation, during an intake stroke.

The drive assembly 128 may be adjustable. More specifically, the relative angular position of the pulley and the mechanical alignment feature 134 may be variable. In the example shown in FIGS. 7 and 24, the pulley 130 is attached to the coupler 132 with bolts 138 passing through slots 140. The bolts 138 can be loosened, the pulley rotated to a selected orientation, and the bolts retightened. A scale 142 may be provided to aid in adjustment. This adjustment allows the physical timing of the valve shaft 80 to be altered to tune the operating characteristics of the engine 10.

As shown in FIG. 2, one drive assembly 128 may be provided for each valve shaft 80. A first drive belt 144 connects the two drive assemblies 128 of one cylinder bank 16 with an idler pulley 146, and a second drive belt 148 connects the idler pulley 146 to a crank pulley 150 of the engine 10. The crank pulley 150, idler pulleys 146, and drive assemblies 128 are sized such that each valve shaft 80 rotates at one-quarter of the rotational speed of the crankshaft 18, or in other words the drive arrangement provides a 4:1 speed reduction. Optionally, one or more of the drive assemblies 128 may incorporate an active adjustment mechanism (not shown) of a known type which is effective to change the angular relationship of the valve shaft 80 to the pulley 130, for example under control by an electronic control unit (not shown). This type of device is commonly referred to as a "cam phaser". This device may be used to actively control the angular orientation or phase of one or both of the valve shafts 80A, 80B relative to the crankshaft 18. This capability is useful for actively controlling operating characteristics of the engine 10 during operation. In a Diesel cycle engine, this capability could be used to serve the function of a compression brake, by selectively advancing the intake valve shaft 80A when braking is desired.

The operation of the engine 10 will be described with reference to FIGS. 25 through 28, which schematically depict a single cylinder 32 of the engine 10. As noted above, the intake valve shaft 80A and exhaust valve shaft 80B are driven by belts or other suitable drive apparatus and rotate at one-quarter of the rotational speed of the crankshaft 18. During the four strokes of the engine 10 using a conventional Otto cycle, the intake valve shaft 80A and exhaust shaft 80B continuously rotate to position their respective apertures 40, 48 in the proper position relative to the ports 34, 42. As shown, during the intake stroke (FIG. 25), the intake aperture 40 of the intake valve shaft 80A is substantially aligned with the intake port 34 to allow air into the combustion chamber 30. The exhaust aperture 48 of the exhaust valve shaft 80B is positioned such that exhaust valve shaft 80B closes the exhaust port 42 and air or gas is prevented from escaping the combustion chamber 30 through the exhaust port 42. During the compression stroke, FIG. 26, the apertures 40 and 48 of the intake and exhaust valve shafts 80A and 80B are both rotated to close off the intake port 34 and exhaust port 42. During the power stroke, FIG. 27, the apertures 40 and 48 of the intake and exhaust shafts 80A and 80B continue to keep the intake and exhaust ports 34, 42 closed. Finally, during the exhaust stroke, FIG. 28, the intake valve shaft 80A continues to close the intake port 34 and the exhaust valve shaft 80B is positioned such that the exhaust port 42 is now opened by substantially aligning the exhaust aperture 48 with the exhaust port 42. The cycle then continues. During this process, there may be overlap of the openings of the valve shafts 80A and 80B similar to valve overlap in a conventional poppet-valve engines. For example, the intake port 34 may start opening as the exhaust port 42 begins to close, such that the intake port 34 and exhaust port 42 are both open for some period of time. This overlap can be beneficial in accelerating filling of the cylinder 32 with the intake mixture. As noted above, the angular separation of the apertures 40 and 48 may be adjusted to change the timing of valve events and the degree of overlap.

The apparatus described above has several advantages over the prior art. The rotary valve structure has significantly lower parts count and frictional losses as compared to a conventional poppet valvetrain. The rotary valve structure also has the potential to be much more reliable than a conventional valvetrain because it does not require reciprocating movement and does not rely on highly-stressed valve springs for operation at high engine speeds.

Furthermore, the sealing assembly described herein will provide effective sealing of the rotary valve apparatus while permitting low mechanical loads and long component life.

It will be understood that the present invention may be implemented as a complete engine, or that the cylinder head assemblies described herein may be retrofitted to an existing internal combustion engine, or that the rotary valve apparatus and/or the sealing assembly may be incorporated into a cylinder head design.

The foregoing has described a rotary valve apparatus, a seal apparatus for a rotary valve apparatus, and an engine with a rotary valve apparatus. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A modular rotary valve apparatus, comprising: a plurality of separate valve barrels coupled to each other and arranged end-to-end along an axis so as to define a valve shaft, each valve barrel having an annular peripheral surface extending between forward and aft end faces, and an aperture extending therethrough transverse to the axis communicating with the peripheral surface on opposite sides; and wherein: the forward face of a first one of the plurality of barrels is adjacent to the aft face of a second one of the plurality of barrels; and the forward face includes an integral stub shaft extending therefrom and the aft face includes an integral stub shaft extending therefrom, and wherein one of the stub shafts comprises pins extending axially therefrom and the other stub shaft comprises holes formed therein, the pins and holes engaging each other to secure the stub shafts to each other.

2. The apparatus of claim 1 wherein the pins and holes of axially adjacent valve barrels are engaged with each other so as to maintain a predetermined angular relationship between the adjacent valve barrels.

3. The apparatus of claim 2 wherein the pins and holes are configured to permit the valve barrels to be assembled in two or more different angular orientations.

4. The apparatus of claim 1 wherein an anti-wear coating is disposed on the peripheral surface of the barrel.

5. The apparatus of claim 1 wherein at least one hole is formed in each valve barrel extending between the forward and aft end faces.

6. The apparatus of claim 1 further comprising a pulley coupled to the valve shaft.

7. The apparatus of claim 1 further comprising a cylindrical bearing surrounding each pair of connected stub shafts.

8. The apparatus of claim 1 wherein the aperture has a racetrack cross-sectional shape.

9. A modular rotary valve apparatus comprising:
the valve shaft of claim 1 mounted for rotation in a cylinder head, the cylinder head including:
at least one combustion chamber having an intake opening and an exhaust opening communicating therewith;
an intake port;
an exhaust port; and wherein one of the valve barrels is disposed between the intake opening and the intake port, and one of the valve barrels is disposed between the exhaust opening and the exhaust port.

10. A modular rotary valve apparatus comprising:

first and second ones of the valve shaft of claim 1 mounted for rotation side-by-side in a cylinder head, the cylinder head including:

at least one combustion chamber having an intake opening and an exhaust opening communicating therewith;

an intake port;

an exhaust port; and wherein one of the valve barrels of the first valve shaft is disposed between the intake opening and the intake port, and one of the valve barrels of the second valve shaft is disposed between the exhaust opening and the exhaust port.

11. The apparatus of claim 9 wherein the cylinder head includes a plurality of valve barrel recesses, each valve barrel recess receiving one valve barrel.

12. The apparatus of claim 9 wherein the cylinder head has upper and lower sections, each section including valve barrel recesses and bearing recesses formed therein, wherein the valve barrel recesses of the upper section are aligned with corresponding valve barrel recesses of the lower section.

13. A method of assembling a modular rotary valve apparatus, comprising: determining a selected angular orientation of a plurality of separate valve barrels, each valve barrel having an annular peripheral surface extending between forward and aft end faces, an aperture extending therethrough transverse to the axis communicating with the peripheral surface on opposite sides, and an integral stub shaft extending from the forward end face and an integral stub shaft extending from the aft end face; coupling the valve barrels to each other in an end-to-end arrangement along an axis so as to define a valve shaft with each valve barrel being in the selected angular orientation, wherein the step of coupling the valve barrels includes the step of coupling a stub shaft of a first one of the valve barrels to a stub shaft of a second one of the valve barrels, wherein the stub shaft of the first one of the valve barrels includes pins extending axially therefrom and the stub shaft of the second one of the valve barrels includes holes formed therein to receive the pins therein, thereby coupling the valve barrels to each other.

14. The method of claim 13 wherein the pins and holes are configured to permit the valve barrels to be assembled in two or more predetermined angular orientations, and the selected angular orientation is one of the predetermined angular orientations.

* * * * *